(12) United States Patent
Niku (10) Patent No.: US 7,249,923 B2
(45) Date of Patent: *Jul. 31, 2007

(54) FLEXIBLE FASTENER

(75) Inventor: Saeed Benjamin Niku, San Luis Obispo, CA (US)

(73) Assignee: California Polytechnic State University, San Luis Obispo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/243,071

(22) Filed: Oct. 3, 2005

(65) Prior Publication Data

US 2006/0088402 A1 Apr. 27, 2006

Related U.S. Application Data

(63) Continuation of application No. 10/065,564, filed on Oct. 30, 2002, now Pat. No. 6,955,513.

(60) Provisional application No. 60/366,165, filed on Mar. 21, 2002.

(51) Int. Cl.
*F16B 35/02* (2006.01)

(52) U.S. Cl. ........................ 411/383; 411/424; 411/392

(58) Field of Classification Search ................ 411/383, 411/392, 378, 411, 424, 483, 901, 902, 384
See application file for complete search history.

(56) References Cited

U.S. PATENT DOCUMENTS

| | | | |
|---|---|---|---|
| 36,014 A | 7/1862 | Meissner | |
| 240,780 A * | 4/1881 | Smith | 74/458 |
| 370,136 A * | 9/1887 | Goddu | 411/411 |
| 534,164 A * | 2/1895 | Larsh | 269/220 |
| 890,447 A * | 6/1908 | Perry | 411/411 |
| 1,231,643 A * | 7/1917 | Parnall | 74/458 |
| 1,469,126 A | 9/1923 | Thomas | |
| 1,756,973 A | 5/1930 | Conner | |
| 1,828,287 A * | 10/1931 | MacBean | 470/11 |
| 1,983,962 A * | 12/1934 | Barber et al. | 74/504 |

(Continued)

FOREIGN PATENT DOCUMENTS

GB 572218 1/1944

OTHER PUBLICATIONS

PCT/US03/08140. International Seach Report. May 5, 2003.

(Continued)

*Primary Examiner*—Flemming Saether
(74) *Attorney, Agent, or Firm*—Thomas F. Lebens; Sinsheimer Juhnke Lebens & McIvor, LLP (57) ABSTRACT

This invention relates generally to a flexible fastener for coupling members. In a preferred embodiment, the flexible fastener may be used to couple members that are non-parallel, non-aligned, or in specific instances when selective compliance in a member is desired. The present invention is directed generally to a fastener that comprises a spiral set of teeth. The spiral set of teeth are configured to allow a nut to travel along at least a portion of the spiral set of teeth. A selectively compliant core material runs completely internally to the spiral set of teeth, so that the fastener is laterally flexible along a length of the fastener. The selectively compliant core material is connected to the spiral set of teeth.

16 Claims, 7 Drawing Sheets

U.S. PATENT DOCUMENTS

| | | | |
|---|---|---|---|
| 2,045,757 A * | 6/1936 | Constantin | 198/659 |
| 2,586,556 A * | 2/1952 | Mullikin | 411/339 |
| 2,672,070 A * | 3/1954 | Forster | 411/438 |
| 2,888,853 A * | 6/1959 | Pachmayr | 411/438 |
| 3,077,809 A * | 2/1963 | Harding et al. | 411/33 |
| 3,350,811 A | 11/1967 | Bender | |
| 3,942,329 A | 3/1976 | Babcock | |
| 3,945,070 A | 3/1976 | Hauser | |
| 4,269,248 A | 5/1981 | MacLean et al. | |
| 4,395,924 A * | 8/1983 | Callahan | 74/424.74 |
| 4,402,160 A | 9/1983 | Brusasco | |
| 4,432,683 A | 2/1984 | Polos | |
| 4,437,286 A | 3/1984 | Maguire | |
| 4,586,179 A | 4/1986 | Sirazi et al. | |
| 4,589,179 A | 5/1986 | Hulting, Jr. | |
| 4,756,654 A | 7/1988 | Clough | |
| 4,974,986 A | 12/1990 | Cook | |
| 5,061,137 A | 10/1991 | Gourd | |
| 5,092,727 A * | 3/1992 | Moghe | 411/411 |
| 5,351,806 A * | 10/1994 | Ohtsuji et al. | 198/659 |
| 5,501,541 A | 3/1996 | Gomes | |
| 5,797,234 A | 8/1998 | Theodorou | |
| 6,647,556 B2 | 11/2003 | Grepper | |
| 6,908,275 B2 * | 6/2005 | Nelson et al. | 411/487 |
| 6,955,513 B2 * | 10/2005 | Niku | 411/382 |

OTHER PUBLICATIONS

Hester, "Professor, University Pursue Provisional Patent for Flexible Bolt", Mustang Daily, a publication of Cal Poly San Luis Obispo, vol. LXVI, No. 123, (May 3, 2002).

Brochure: "Producing Superior Results From Concept to Completion", The Deshler Group Inc., Deshler, Ohio; Amanda Bent Bolt Co.

Catalog: Simpson Strong-Tie Co. Inc., Copyright 1998, pp. 14-17.

Catalog: "Stow Flexible Shafts annd Flexible Couplings", 9th edition, The Stow Manufacturing Co, Binghamton, New York.

Website: Amanda Bent Bolt; www.amandabentbolt.com, (Jan. 9, 2001).

Website: AristoTechnics, Inc.; www.artsotechnics.com, (Jan. 11, 2001).

* cited by examiner

FLEXIBLE FASTENER

CROSS-REFERENCES TO RELATED APPLICATIONS

This is a continuation of prior application Ser. No. 10/065,564 filed on Oct. 30, 2002, now U.S. Pat. 6,955,513 which is hereby incorporated by reference in its entirety. This application claims the benefit of U.S. Provisional Application No. 60/366,165, filed Mar. 21, 2002, which is also hereby incorporated by reference in its entirety.

BACKGROUND OF INVENTION

1. Field of the Invention

This invention relates generally to a flexible fastener for coupling members. In a preferred embodiment, the flexible fastener may be used to couple members that are non-parallel, nonaligned, or in specific instances when selective compliance in a member is desired.

2. Discussion of the Related Art

Entirely rigid fasteners have been used previously to couple members. However, due to the rigidity of prior art fasteners, only perfectly planar and aligned members could be coupled. Additionally, members requiring selective compliance, could not be attached with the fasteners of the prior art.

Previously contemplated devices to obviate these and other problems were developed such as the bolt structure described in U.S. Pat. No. 36,014 of Meissner. Meissner teaches a bolt structure made of a bolt shank comprised of a collection of wires twisted together with solid ends on either end of the shank. The solid ends at either end of the shank are for a bolt head and for cutting threads necessary to receive a nut. The bolt contemplated by Meissner consists of a flexible portion intermediate to solid portions on either distal end of the bolt structure. While the bolt described by Meissner may be advantageous in comparison to a totally rigid bolt in some circumstances, the bolt still has some limitations. Namely, the inherently rigid portions on either end of Meissner's bolt are not sufficient to couple non-planar or non-aligned members easily. Additionally, because the threads of Meissner's bolt are limited solely to the rigid portions on either side of the flexible material the bolt cannot accept a nut along its entire length. Finally, due the rigid portions at either end of Meissner's bolt, it cannot be laterally flexible along its entire length.

The present invention addresses the above and other needs.

SUMMARY OF INVENTION

The present invention is directed generally to a fastener that comprises a spiral set of teeth. The spiral set of teeth are configured to allow a nut to travel along at least a portion of the spiral set of teeth. A selectively compliant core material runs completely internally to the spiral set of teeth, so that the fastener is laterally flexible along a length of the fastener. The selectively compliant core material is connected to the spiral set of teeth.

In a preferred embodiment, a means for imparting rotational movement to the fastener is attached at a distal end. The preferred means are a bolt head and a screw head.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

DETAILED DESCRIPTION

The following description is of the best mode presently contemplated for practicing the invention. This description is not to be taken in a limiting sense, but is made merely for the purpose of describing the general principles of the invention. The scope of the invention should be ascertained with reference to the issued claims. In the description that follows, like numerals or reference characters will be used to refer to like parts or elements throughout.

The fastener of the present embodiment is compliant in lateral directions, yet capable of carrying axial loads, i.e. the fastener is not compliant in the axial direction. As such, the fastener may be used in a variety of applications to connect, tighten, or load other elements in the axial direction along the length of the fastener as any other fastener is, but is flexible to go through mismatched and misaligned holes and holes that are not straight, between non-parallel (i.e. non-planar) surfaces, or in machine applications where small lateral movements are desired.

The fastener constructed in accordance with the present embodiment is designed for many uses for which it would be impracticable or impossible to employ a rigid or inflexible fastener. Thus, in many cases, in securing members together, it is not possible to position the members in a perfectly parallel (i.e. non-planar) or aligned fashion. Therefore, a bolt with inherent flexibility may be used to secure members that are either non-parallel or non-aligned, due to production or construction errors. Such errors may include incorrectly bored holes, incorrectly aligned members or mismatched members. Although the embodiment contemplates coupling non-parallel or non-aligned members, due to the fasteners ability to carry an axial load, the fastener may be used to couple members that are planar or aligned. The fastener is multi-faceted and may be used in numerous applications and situations to couple various types of members. Among the types of members that may be connected are plastic, wood, metal, drywall, rubber, leather, cardboard, rock and/or granite (such as in the use of countertops) and either hollow or solid. Besides providing a means to fasten members that are non-parallel or nonaligned, the embodiment may also be used in circumstances when selective compliance is useful or necessary. Selective compliance, i.e. maintaining stiffness in the axial direction, but compliance in the lateral direction, is especially useful in machinery. In a preferred embodiment, the fastener may be used specifically in robots. For example, in one embodiment, it may be advantageous for the robot to move a part laterally, but not axially, such as in inserting one part into another during assembly. Therefore, a flexible fastener may be used to couple the part to the robot so that the part will have lateral motion, but not axial motion. The fastener may be used in combination with various robotic parts either alone or with other types of fasteners, or for example, in conjunction with other flexible fasteners. In another application, the fastener may be used in medical applications such as in knee replacement devices.

Figures 1, 2:
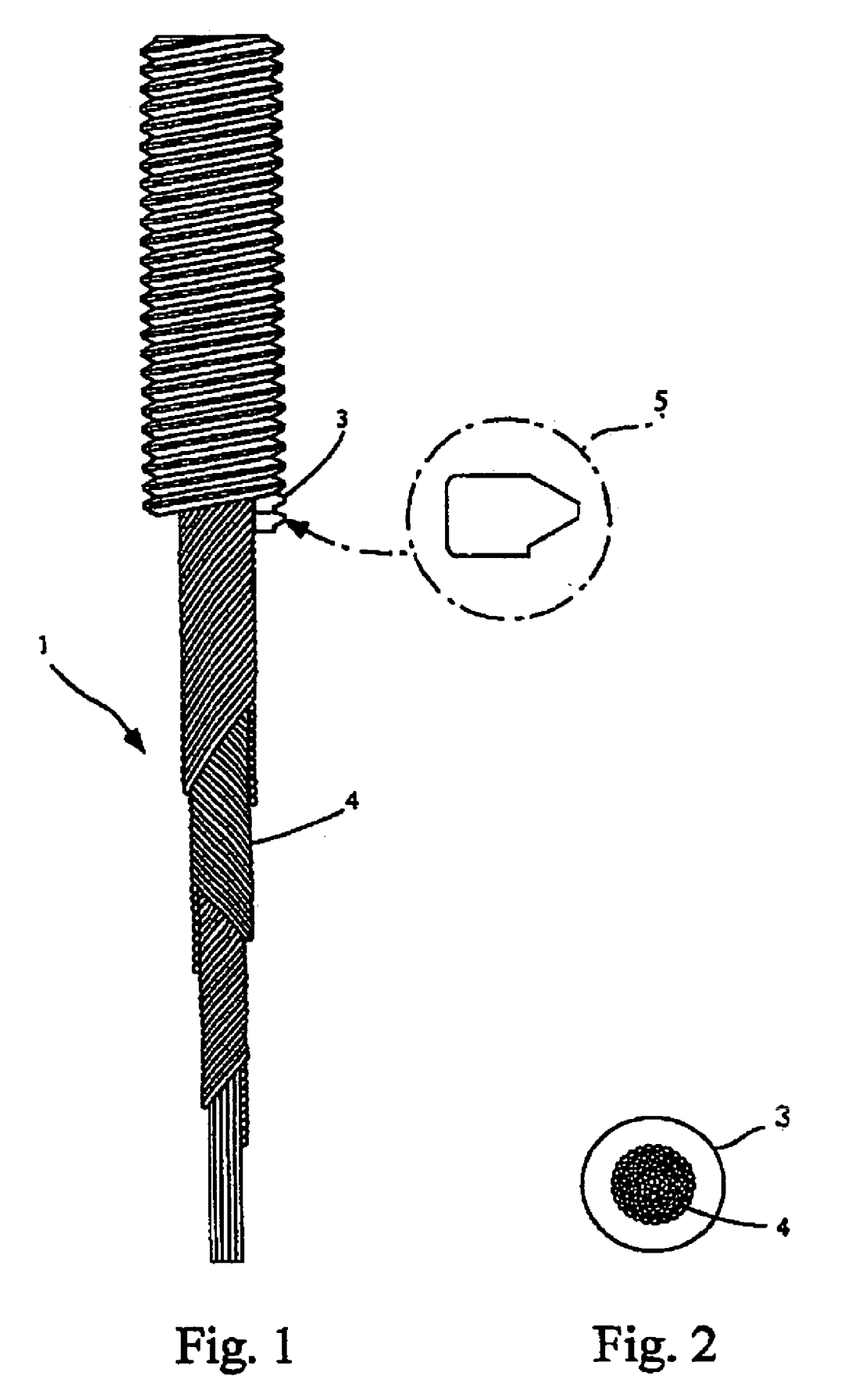
FIG. 1 is a side elevational view, partly in cross section, of a flexible fastener with flexible core material composed of innermost wires grouped and bound with wires spirally wound in opposing directions, and a detail picture of a tooth.
FIG. 2 is an in view of the flexible fastener of FIG. 1 with flexible core material composed of innermost wires grouped and bound with wires spirally wound in opposing directions.

Referring now to the drawings, the features and embodiments are now father described. In FIG. 1, a flexible fastener 1 is depicted. Shown are a flexible fastener 1, a spiral set of teeth (i.e. threads) 3, a flexible core material 4, a detail picture of a tooth 5, which in combination with other teeth comprises the spiral set of teeth (i.e. threads) 3. The spiral set of teeth (i.e. threads) 3 surrounds the flexible core material 4. The flexible core material 4 is connected to the spiral set of teeth at both distal ends.

The spiral set of teeth 3 (i.e. threads) can slide, rotate or both slide/rotate relative to each other. The spiral set of teeth (i.e. threads) 3 can be made of a variety of materials such as metal, solid plastic material, composites, fiberglass, and fibers of various materials such as carbon, Kevlar, silk, linen, and nylon. Also shown in FIG. 1 is a detail picture of one possible conformation of a tooth 5, which in combination with similar teeth comprises the spiral set of teeth (i.e. threads) 3. Although the structure of tooth 5 shows one possible conformation, many other conformations of teeth are possible to produce a spiral set of teeth (i.e. threads) 3, as are described and depicted later in the application.

The flexible core material 4 is flexible and load carrying. The flexible core material 4 can be made of almost any material in any appropriate configuration such that it provides axial load carrying capability while laterally flexible. In a preferred embodiment, the flexible core material 4 can be made of nylon or other fibers, torque carrying flexible shafts, and solid plastic material. In another preferred embodiment, the flexible core material 4 may be comprised of innermost wires grouped and bound with wires spirally wound in opposing directions, as is shown in FIG. 1.

Figure 3:
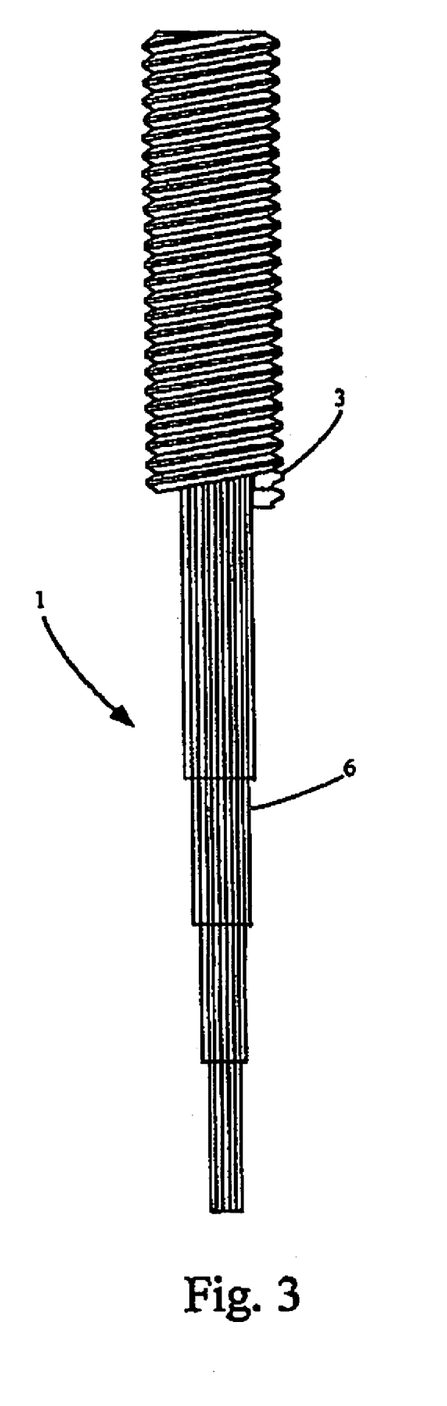
FIG. 3 is a side elevational view, partly in cross section, of a flexible fastener with flexible core material composed of individual innermost wires.

Although in some situations this particular conformation may be advantageous, the flexible core material may assume many other conformations including individual fibers running in the same direction along the length of the flexible fastener 1, such as is shown in FIG. 3, or solid material running the length of the flexible fastener 1.

The flexible core material 4 is coupled to the set of spiral teeth (i.e. threads) 3 at both distal ends. Any method may be employed to couple the flexible core material 4 to the spiral set of teeth 3. As a result of coupling the flexible core material 4 to the spiral set of teeth, the fastener remains flexible while a nut can travel along the length of the bolt and carry an axial load. In a preferred embodiment, the flexible core material 4 is connected to the spiral set of teeth 3 by any method such as gluing, brazing, welding, and pinching. In another preferred embodiment, the flexible core material 4 may be coupled to the spiral set of teeth 3 by welding, pinching or brazing a plate, such as a washer, to the flexible core material 4 at a distal end so that the threads 3, sits on top of the plate.

Looking now at FIG. 2, an in view of the flexible fastener 1 is shown. Included in the in view are the flexible core material 4, which runs the length of the flexible fastener 1. The in view shows only one possible configuration of the flexible core material 4. In this case, the flexible core material 4 is comprised of innermost stands grouped and bound with strands spirally wound in opposing directions.

Shown in FIG. 3 is another example of a flexible fastener 1. Shown are a flexible fastener 1, a spiral set of teeth (i.e. threads) 3, and a second type of flexible core material 6. The spiral set of teeth (i.e. treads) 3 surrounds the type 11 flexible core material 6. The flexible core material 6 is connected to the spiral set of teeth 3 at both distal ends. The type II flexible core material 6 is composed of a number of individual threads running in a single orientation the entire distance of the flexible fastener 1. The type 11 flexible core material 6 is just another example of the numerous configurations the core material may have.

Figure 4:
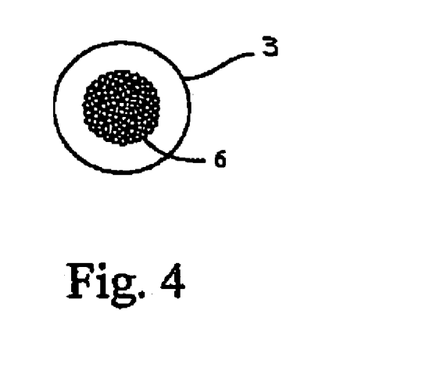
FIG. 4 is an in view of the flexible fastener of FIG. 3 with flexible core material composed of individual innermost wires.

FIG. 4 shows an in view of the flexible fastener 1. Included in the in view are the spiral set of teeth 3 and the type II flexible core material 6, which runs the length of the flexible fastener in a single orientation and is composed of a number of individual strands grouped together. The type 11 flexible core material 6 is another example of the many possible configurations that the core material may have.

Figure 5:
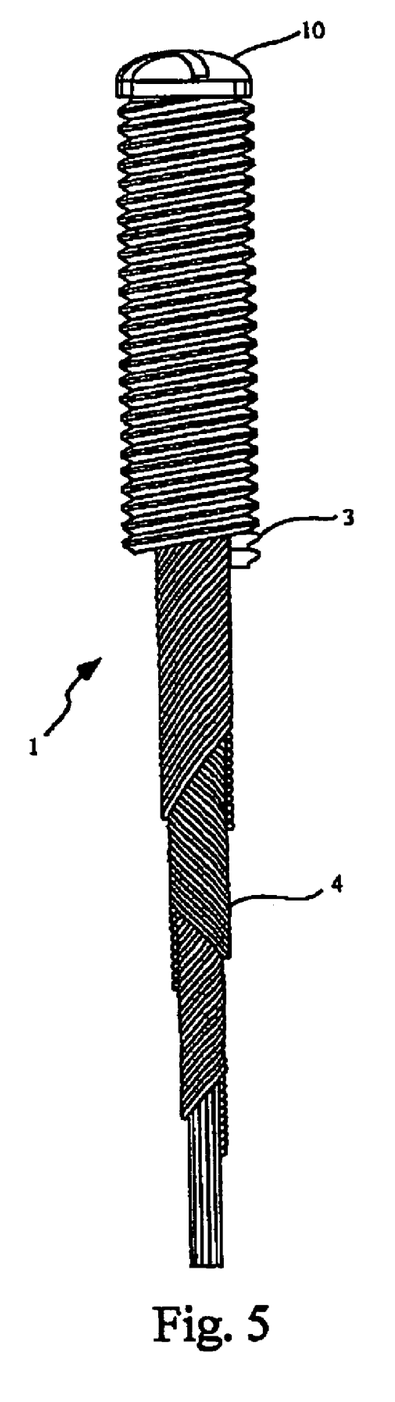
FIG. 5 is a side elevational view, partly in cross section, of a flexible fastener with a screw head.

Shown in FIG. 5 is a flexible fastener 1 with a screw head 10. Shown are a flexible fastener 1, a spiral set of teeth (i.e. threads) 3, a flexible core material 4, and a screw head 10. Coupled with a distal end of the spiral set of teeth 3 is a screw head 10. Flexible core material 4 runs internally along the length of the flexible fastener 1. Surrounding the flexible core material 4, is the set of spiral teeth (i.e. thread) 3.

In a preferred embodiment, a means for imparting rotational movement may be coupled with a distal end of the flexible fastener 1. The means, although not necessary for using the flexible fastener 1, may be advantageous in certain applications. In a preferred embodiment, the means for imparting rotational movement is a screw head 10. In this scenario, the groove carved into the screw head 10 may be in a conformation to accept either a standard or Philips type screwdriver. In this case, the flexible fastener 1 may couple two members when a screwdriver is applied to the screw head 10 and is subsequently rotated, thereby rotating the entire flexible fastener 1, to secure the flexible fastener 1 into the members. The other distal end of the flexible fastener 1 may be fashioned to include a spiral set of teeth (i.e. threads) 3 so that each consecutive layer of teeth has a slightly smaller diameter than the previous one until the distal end ends in a point so that the flexible fastener 1 may be secured into a hard surface such as a wall or board. Alternatively, the other distal end may end bluntly.

Figure 6:
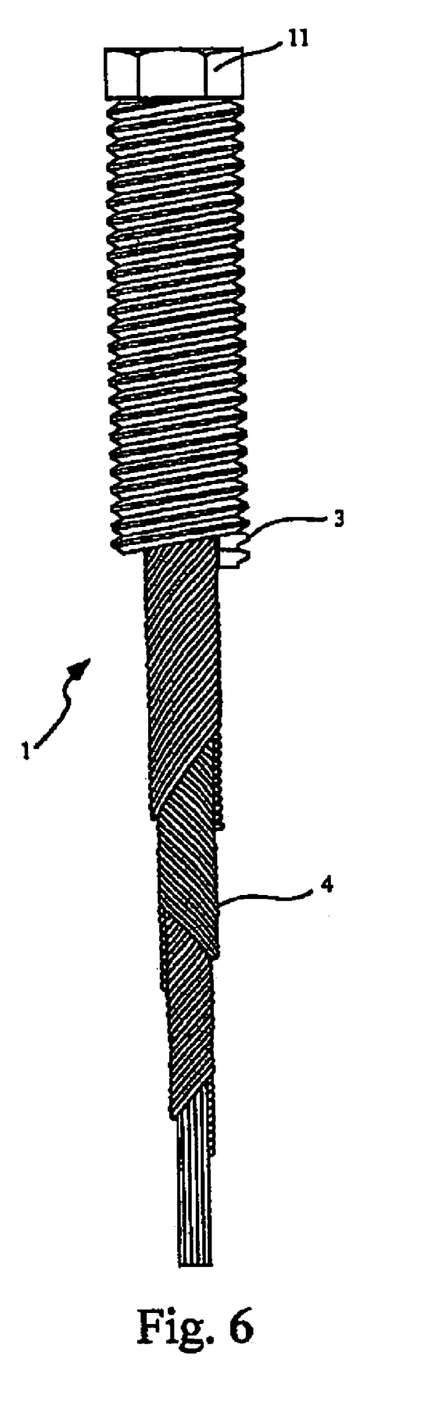
FIG. 6 is a side elevational view, partly in cross section, of a flexible fastener with a bolt head.

Shown in FIG. 6 is a flexible fastener 1 with a bolt head 11. Shown are a flexible fastener 1, a spiral set of teeth (i.e. threads) 3, a flexible core material 4, and a bolt head 11. Coupled with a distal end of the spiral set of teeth 3 is a bolt head 11. Flexible core material 4 runs internally along the length of the flexible fastener 1. Surrounding the flexible core material 4, is the set of spiral teeth (i.e. threads) 3.

In another preferred embodiment, the means for imparting rotational movement is a bolt head 11. Although as in the case of the screw head, the rotational means are not necessary for using the flexible fastener 1. However, the means may be advantageous in certain applications. In a preferred embodiment, the bolt head 11 is coupled to a distal end of the flexible fastener 1. The bolt head 11 may be made of a mass of metal, or some other material, in a rectangular or hexagonal shape. Although a rectangular or hexagonal shape is preferred, any standard shape to fit a wrench, or other rotational device, may be employed. To impart rotational movement, a wrench, or other device for applying torque to a bolt head, may be applied to the bolt head 11 so that the bolt head 11 rotates, and thereby rotates the entire flexible fastener 1 so that the flexible fastener 1 may couple two members. Alternatively, the wrench, or other device for applying torque may be applied to a nut so that the nut is rotated with respect to the flexible fastener 1. The other distal end of the flexible fastener 1 may be fashioned to include a spiral set of teeth (i.e. threads) 3 so that each consecutive layer of teeth has a slightly smaller diameter than the previous one until the distal end ends in a point so that the flexible fastener 1 may be secured into a hard surface such as a wall or board. Alternatively, the other distal end may end bluntly.

Figures 7, 8:
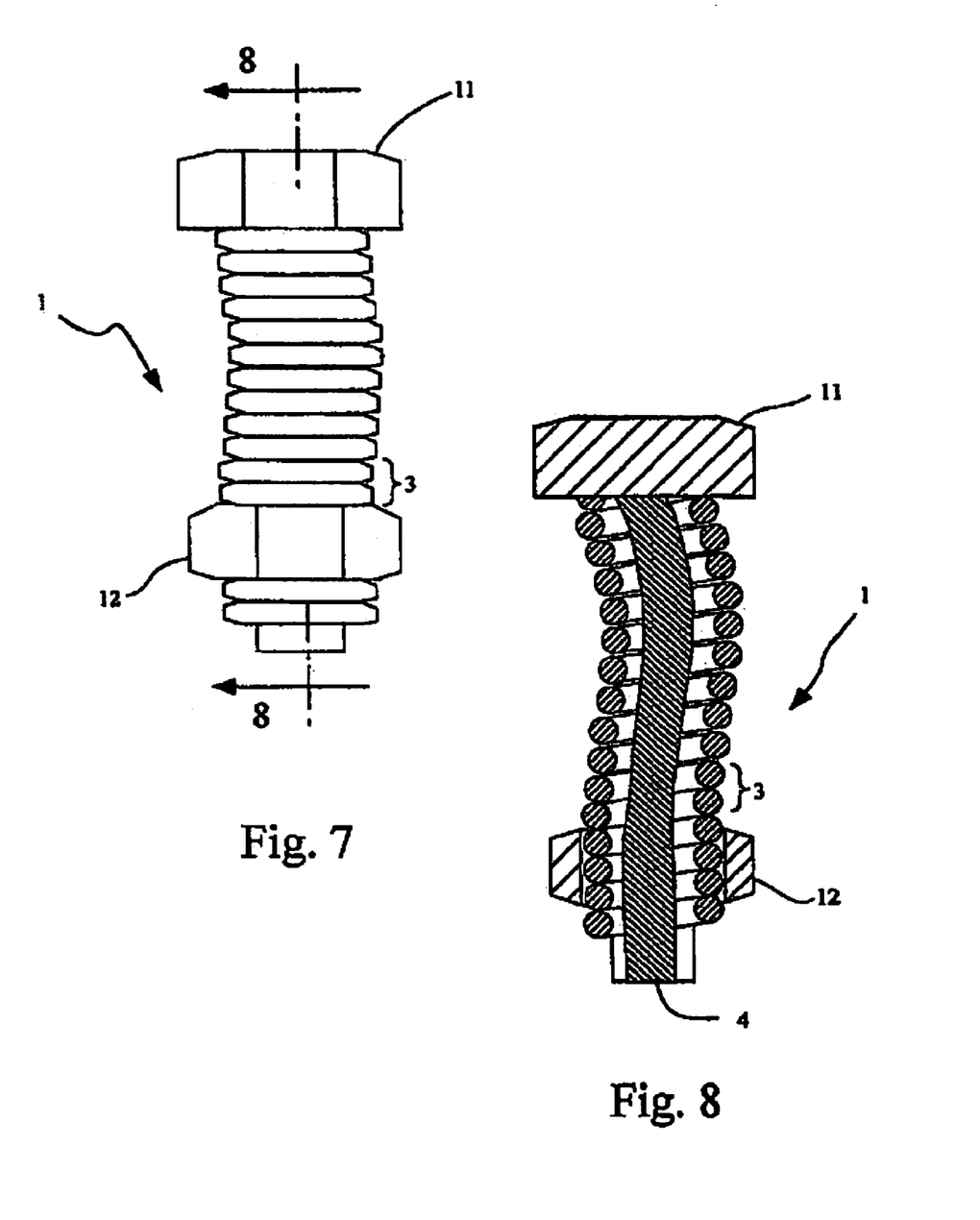
FIG. 7 is a side elevational view of a flexible fastener with a bolt head and nut.
FIG. 8 is a side elevational view, in cross section, of a flexible fastener with a bolt head and nut.

Turning now to FIGS. 7 and 8, a flexible fastener 1 with a bolt head 11 and nut 12 is shown. Shown are a flexible fastener 1, a spiral set of teeth (i.e. threads) 3, flexible core material 4, a bolt head 11, and a nut 12. The flexible core material 4 is surrounded by the spiral set of teeth 3, which is covered with a spiral set of teeth (i.e. threads) 3. The spiral set of teeth 3 is shown with a bolt head 11 coupled at one distal end and a nut receiving means coupled at the other distal end. A nut 12 is shown engaged with the flexible fastener 1.

As a nut 12 is engaged with a flexible fastener 1, the flexible fastener 1 is constructed so that the spiral set of teeth (i.e. threads) 3 are compressed so that the tensile load is carried by the flexible core material 4 (as opposed to the spiral set of teeth (i.e. threads) 3). Therefore, tension is not carried by the threads, but is transferred to the flexible core material 4, thus increasing the strength of the flexible fastener 1.

Figure 9:
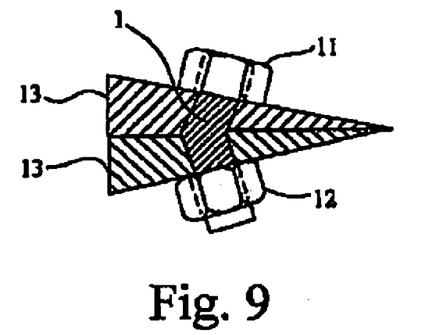
FIG. 9 is an example of a flexible fastener coupling two members that are non-parallel.

Referring now to FIG. 9, two non-parallel members 13 are shown coupled with a flexible fastener 1. Shown are a flexible fastener 1, a bolt head 11, two non-parallel members 13, and a nut 12. The flexible fastener 1 is inserted through holes in both non-parallel members 13 and secured with a nut 12 by rotating the bolt head 11 relative to the nut 12. Alternatively, the nut 12 may be rotated relative to the bolt head 11. The flexible fastener 1 is shown to have lateral flexibility while carrying an axial load.

Figure 10:
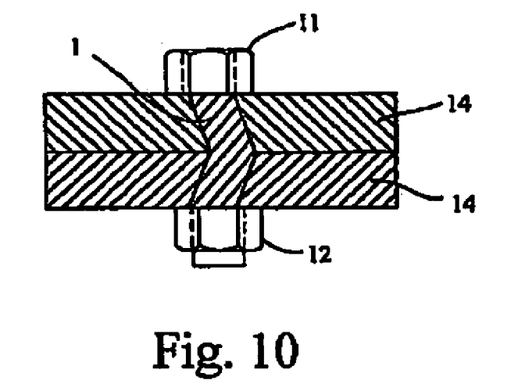
FIG. 10 is an example of a flexible fastener coupling two members that are non-aligned.

Turning now to FIG. 10, two members with non-aligned holes 14 are shown coupled with a flexible fastener 1. Shown are a flexible fastener 1, a bolt head 11, two non-aligned members 14, and a nut 12. The flexible fastener 1 is inserted through holes in both non-aligned members 14 and secured with a nut 12 by rotating the bolt head 11 relative to the nut 12. Alternatively, the nut 12 may be rotated relative to the bolt head 11. The flexible fastener 1 is shown to have lateral flexibility while carrying au axial load.

Figure 11:
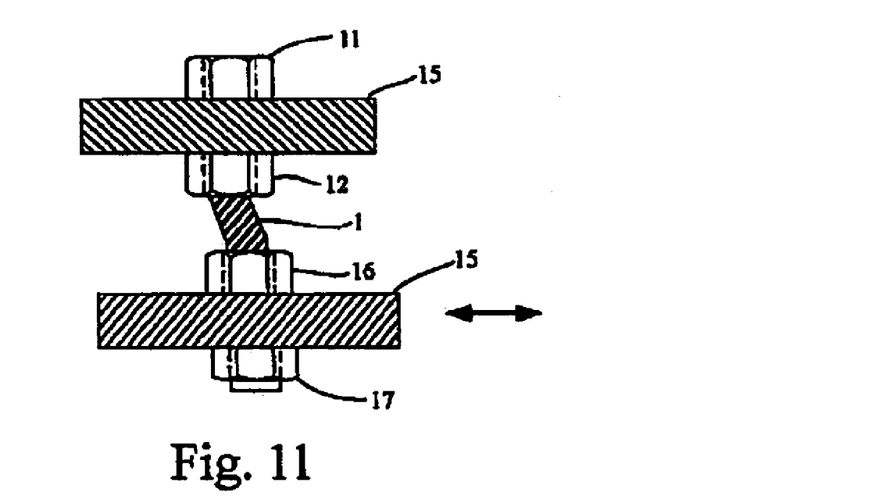
FIG. 11 is an example of a flexible fastener coupling two members that have selective compliance relative to each other.
Figure 12:
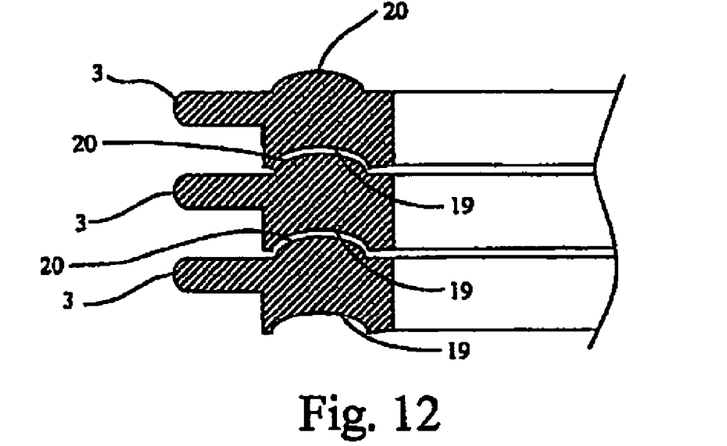
FIG. 12 is an example of fastener threads (or teeth)
Figure 13:
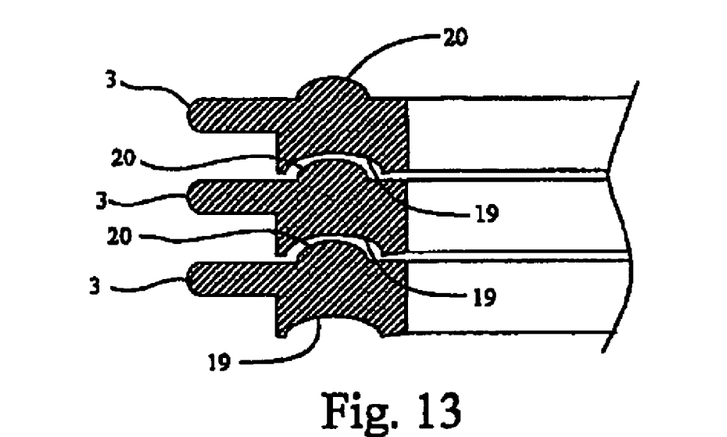
FIG. 13 is an example of fastener threads (or teeth) that allow rotation.

Looking now at FIG. 11, a flexible fastener 1 is shown coupling two members 15 in a selectively compliant manner, in this case laterally. Shown are a flexible fastener 1, a bolt head 11, members 15 connected in a laterally compliant manner and nuts 12, 16, and 17. The flexible fastener is inserted through holes in both members 15 and secured with a series of nuts 12, 16, 17 by rotating the bolt head 11 relative to the first nut 12 and then rotating the second nut 16 relative to the first nut 12 and so on. Alternatively, the first nut 12 may be rotated relative to bolt head 11 and then the second nut 16 rated relative to the first nut 12 and so on. The flexible fastener 1 is shown to have compliance in the lateral direction while maintaining rigidity in the axial direction. In this embodiment, the selectively compliant members 15 may have motion relative to each other in the lateral direction only.

As is shown in FIG. 12, FIG. 13, FIG. 14, FIG. 15, FIG. 16, FIG. 17, and FIG. 18, many different variations of teeth are contemplated for use in the present invention. The spiral set of teeth 3 (i.e. threads) can be made of any material that is fit to carry the intended loads, in many different conformations, such as those shown in FIG. 12, FIG. 13, FIG. 14, FIG. 15, FIG. 16, FIG. 17, and FIG. 18, so long as it carries the intended loads and the threads remain laterally flexible. Additionally, the spiral set of teeth 3 (i.e. threads) should be able to slide, rotate, or both slide and rotate relative to each other.

Figure 14:
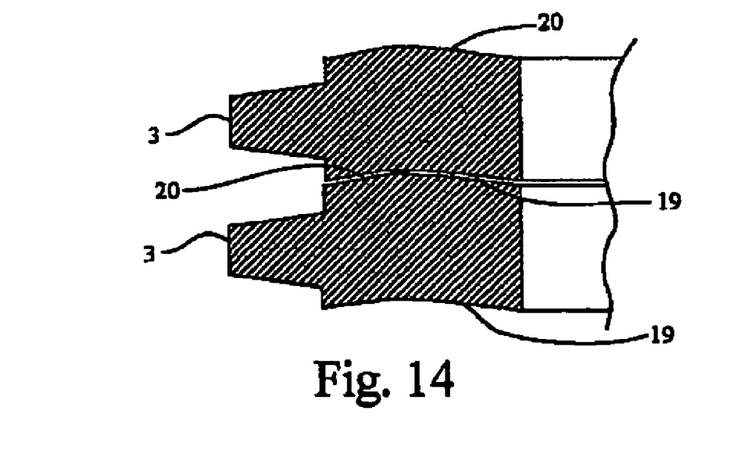
FIG. 14 is an example of fastener threads (or teeth) that were cut from a square threaded bolt.
Figure 15:
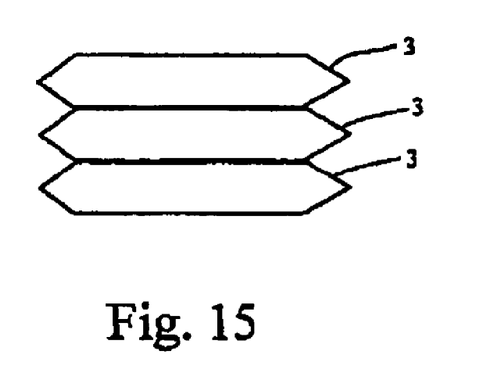
FIG. 15 is an example of fastener threads (or teeth)
Figure 16:
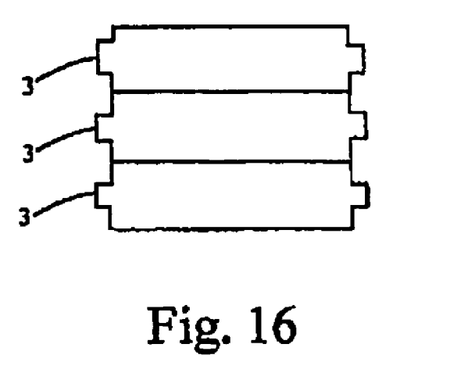
FIG. 16 is an example of fastener threads (or teeth)
Figure 17:
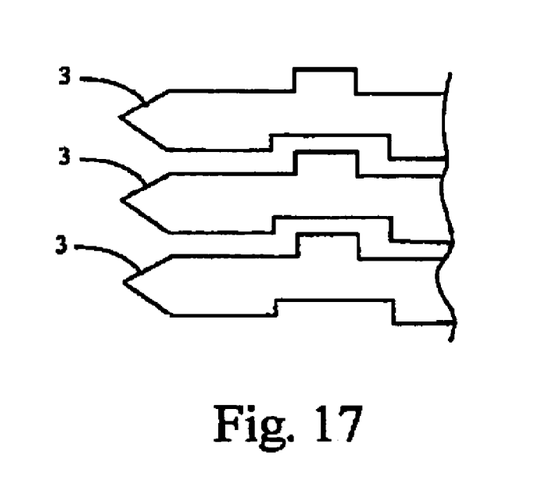
FIG. 17 is an example of fastener threads (or teeth)
Figure 18:
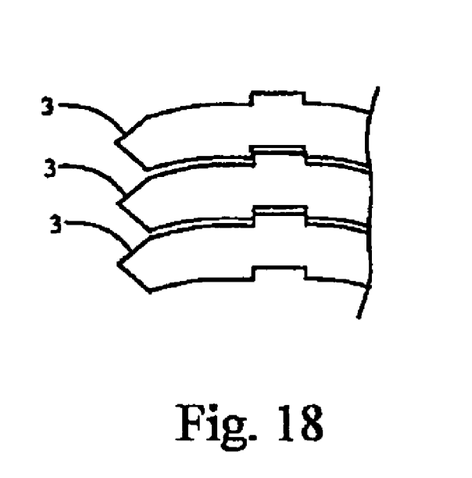
FIG. 18 is an example of fastener threads (or teeth).

Certain variations of teeth may be especially useful in different circumstances. For example, an interlocking spiral set of teeth 3 (i.e. thread pattern), such as those shown in FIG. 12, FIG. 13, FIG. 17 and FIG. 18, are useful for larger loads because they prevent buckling of teeth. In another example, a spiral set of teeth 3 (i.e. threads) are advantageously cut from a square threaded bolt as shown in FIG. 14. Threads (spiral set of teeth 3) can also be produced by rolling, extrusion, casting, and all manners of computer aided manufacturing such as fused deposition, stereo lithography, and 3-dimensional printing. Besides the spiral set of teeth 3 (i.e. thread) conformations shown in FIG. 12, FIG. 13, FIG. 14, FIG. 15, FIG. 16, FIG. 17, and FIG. 18, in another embodiment, the threads may also be comprised of a compression spring with proper pitch and wire diameter to match the flexible core material's 4 diameter. In any case, the pitch and diameter of a spiral set of teeth 3, compression spring, or threads should be commensurate with the pitch and diameter of the flexible core material's 4 pitch and diameter as well as the pitch and diameter of a given nut to be used in conjunction with the flexible fastener 1, so that the nut may be advanced on it.

As is previously described, the flexible fastener is useful in numerous situations. The flexible fastener is especially advantageous to easily and inexpensively couple non-parallel and non-aligned members. Additionally, the flexible fastener is also useful in various situations where selective compliance is desired. Among the many situations where the flexible fastener may be advantageously used are: construction, seismic applications, robotics, machine applications, flexible power transportation, and medical devices (e.g., knee replacement devices). All references cited herein are incorporated by reference.

What is claimed is:

1. A fastener, comprising:
   a spiral set of teeth, the spiral set of teeth being configured to allow a nut to travel along at least a portion of the spiral set of teeth, adjacent ones of the spiral set of teeth being in contact with each other and carrying the load of the nut to an end of the fastener;
   a selectively compliant core material running completely internally to the spiral set of teeth, so that the fastener is laterally flexible along a length of the fastener; and
   coupling means for connecting the selectively compliant core material to the spiral set of teeth.

2. The fastener of claim 1, wherein the coupling means is welding.

3. The fastener of claim 1, wherein the coupling means is pinching.

4. The fastener of claim 1, wherein the selectively compliant core material comprises intermost wires grouped and bound with wires spirally wound in both directions.

5. The fastener of claim 1, wherein the spiral set of teeth interlock into one another.

6. The fastener of claim 1, further comprising a rotational element coupled to one of the ends of the spiral set of teeth for imparting rotational movement thereto.

7. The fastener of claim 6, wherein the rotational element is a bolt head.

8. The fastener of claim 6, wherein the rotational element is a screw head.

9. A fastener, comprising:
   a spiral set of threads, the spiral set of threads being configured to allow a nut to travel along at least a portion of the threads, adjacent ones of the spiral set of threads being in contact with each other and carrying the load of the nut to an end of the fastener; and
   selectively compliant core material running completely internally to the spiral set of threads, wherein the selectively compliant core material is coupled to the spiral set of threads so that the fastener is laterally flexible along a length of the fastener.

10. The fastener of claim 9, wherein the selectively compliant core material is coupled to the threads using welding.

11. The fastener of claim 9, wherein the selectively compliant core material is coupled to the threads using pinching.

12. The fastener of claim 9, wherein the selectively compliant core material comprises intermost wires grouped and bound with wires spirally wound in both directions.

13. The fastener of claim 9, wherein the spiral set of threads interlock into one another.

14. The fastener of claim 9, further comprising a rotational element coupled to one of the distal ends of the set of threads.

15. The fastener of claim 14 wherein the rotational element is a bolt head.

16. The fastener of claim 14 wherein the rotational element is a screw head.

* * * * *